(12) United States Patent
Newman et al.

(10) Patent No.: US 7,508,850 B2
(45) Date of Patent: Mar. 24, 2009

(54) APPARATUS FOR MODIFYING $CO_2$ SLAB LASER PULSES

(75) Inventors: Leon A. Newman, Glastonbury, CT (US); John Kennedy, Granby, CT (US); Joel Fontanella, Tolland, CT (US); Phillip J. Gardner, West Hartford, CT (US)

(73) Assignee: Coherent, Inc., Santa Clara, CA (US)

( * ) Notice: Subject to any disclaimer, the term of this patent is extended or adjusted under 35 U.S.C. 154(b) by 767 days.

(21) Appl. No.: 10/932,818

(22) Filed: Sep. 2, 2004

(65) Prior Publication Data

US 2006/0045150 A1 Mar. 2, 2006

(51) Int. Cl.
*H01S 3/10* (2006.01)

(52) U.S. Cl. .................. 372/25; 372/29.015; 372/26; 372/12

(58) Field of Classification Search .................. 372/25, 372/29.015, 12, 26
See application file for complete search history.

(56) References Cited

U.S. PATENT DOCUMENTS

| | | | | |
|---|---|---|---|---|
| 3,237,011 A | * | 2/1966 | Sterzer | 359/325 |
| 3,393,955 A | * | 7/1968 | Sterzer | 359/247 |
| 3,414,728 A | * | 12/1968 | Patel | 398/184 |
| 3,527,521 A | * | 9/1970 | Osterink et al. | 359/484 |
| 3,568,095 A | | 3/1971 | Cordalis | 332/24 |
| 3,581,230 A | * | 5/1971 | Smith | 372/11 |
| 4,174,504 A | * | 11/1979 | Chenausky et al. | 372/11 |
| 4,483,005 A | | 11/1984 | Smart | 372/25 |
| 4,767,195 A | * | 8/1988 | Pepper | 359/276 |
| 5,680,412 A | | 10/1997 | DeMaria et al. | 372/92 |
| 5,852,621 A | | 12/1998 | Sandstrom | 372/25 |
| 5,987,042 A | | 11/1999 | Staver et al. | 372/30 |
| 6,678,082 B2 | | 1/2004 | Pike et al. | 359/245 |
| 6,697,408 B2 | | 2/2004 | Kennedy et al. | 372/55 |
| 6,784,399 B2 | | 8/2004 | Dunsky et al. | 219/121.68 |

(Continued)

FOREIGN PATENT DOCUMENTS

EP 1 095 726 A1 5/2001

OTHER PUBLICATIONS

A.V.V. Nampoothiri et al., "Single pulse selection from a cw mode-locked laser," *Review of Scientific Instruments*, vol. 69, No. 3, Mar. 1998, pp. 1240-1242.

*Primary Examiner*—Minsun Harvey
*Assistant Examiner*—Delma R Forde
(74) *Attorney, Agent, or Firm*—Stallman & Pollock LLP

(57) ABSTRACT

The quality of pulses output from laser systems such as super-pulsed $CO_2$ slab lasers can be improved using half-wavelength electro-optic modulators (EOMs), in combination with thin film polarizers (TFPs). A voltage applied across a CdTe crystal of the EOM rotates the polarization of a pulse passing through the EOM by 90°. The polarization determines whether the pulse passes through, or is redirected by, the TFP. The voltage applied to the crystal can be pulsed to prevent a drop in charge, which could allow radiation to leak to the application. A totem pole switch used to apply voltage to the EOM can receive a pulsed voltage for improved performance. Directing by the EOM allows pulses to be clipped at the front/back end(s), split into portions, and/or directed to separate scanners. Directing pulses or pulse portions to different scanners can increase the output of systems such as hole drilling systems.

13 Claims, 9 Drawing Sheets

U.S. PATENT DOCUMENTS

| | | | |
|---|---|---|---|
| 7,039,079 B2* | 5/2006 | Seguin et al. | 372/27 |
| 7,113,529 B2 | 9/2006 | Seguin et al. | 372/39 |
| 2002/0167974 A1* | 11/2002 | Kennedy et al. | 372/10 |
| 2003/0068836 A1 | 4/2003 | Hongo et al. | 438/30 |
| 2004/0101001 A1 | 5/2004 | Bergmann et al. | 372/25 |
| 2004/0179775 A1* | 9/2004 | Seguin et al. | 385/31 |

* cited by examiner

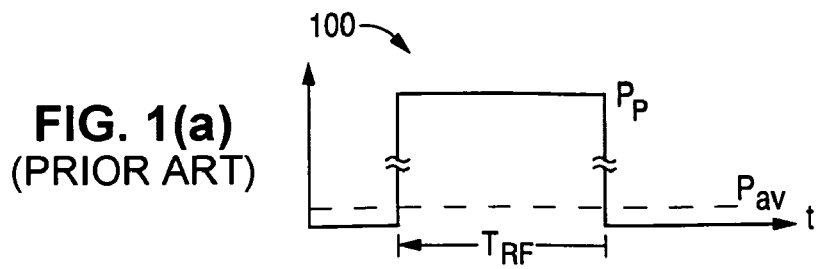
FIG. 1(a)
(PRIOR ART)
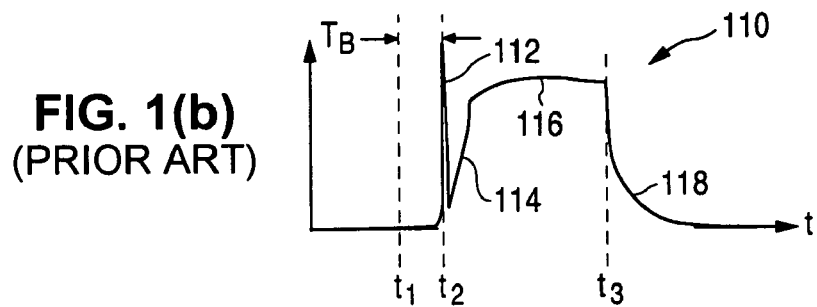
FIG. 1(b)
(PRIOR ART)
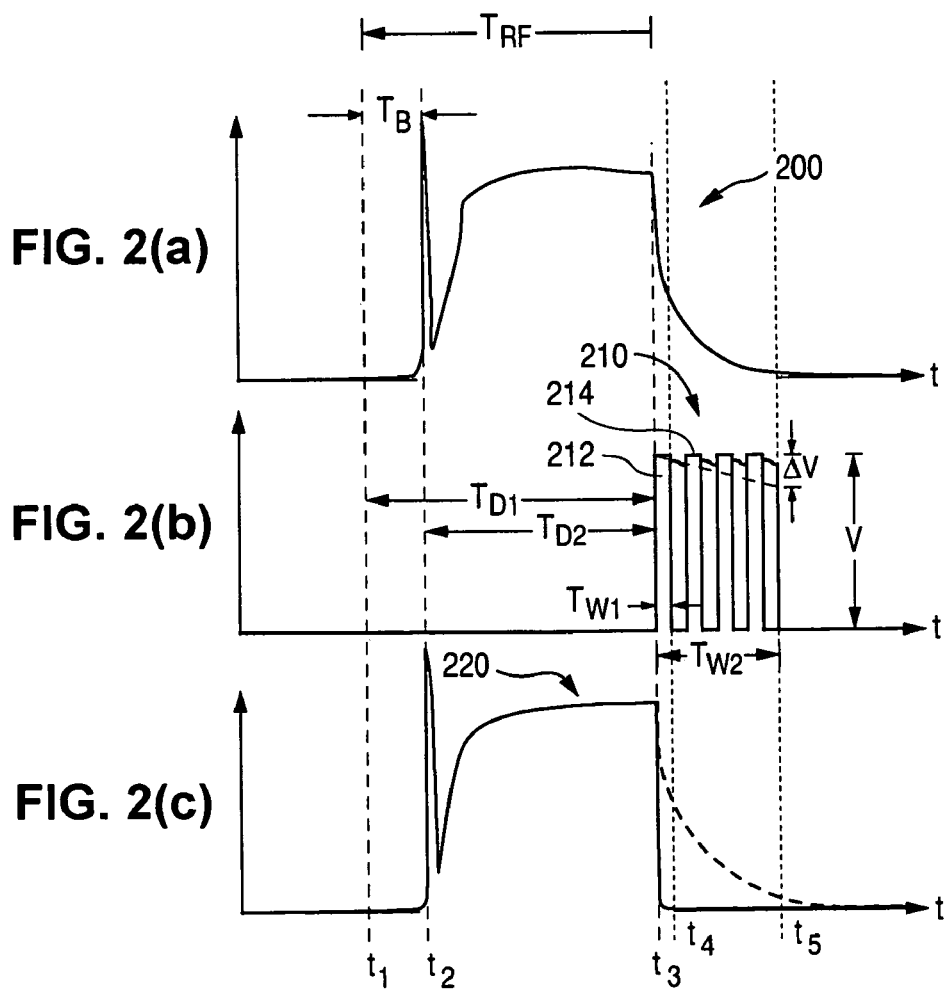
FIG. 2(a)
FIG. 2(b)
FIG. 2(c)

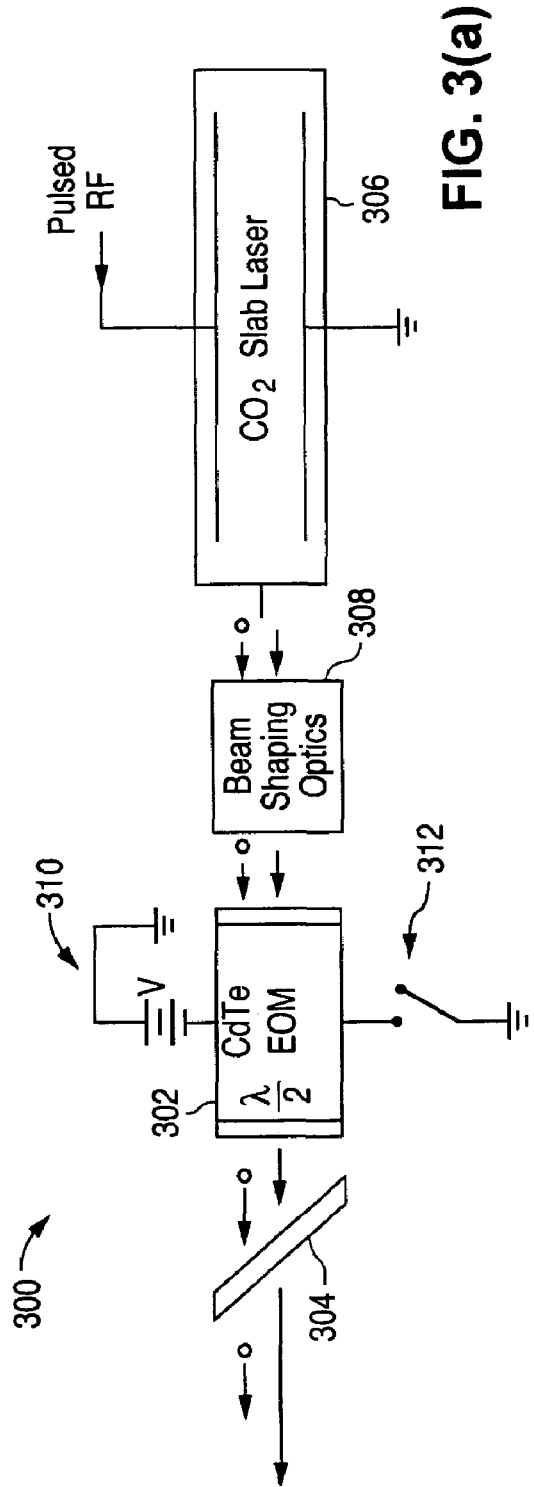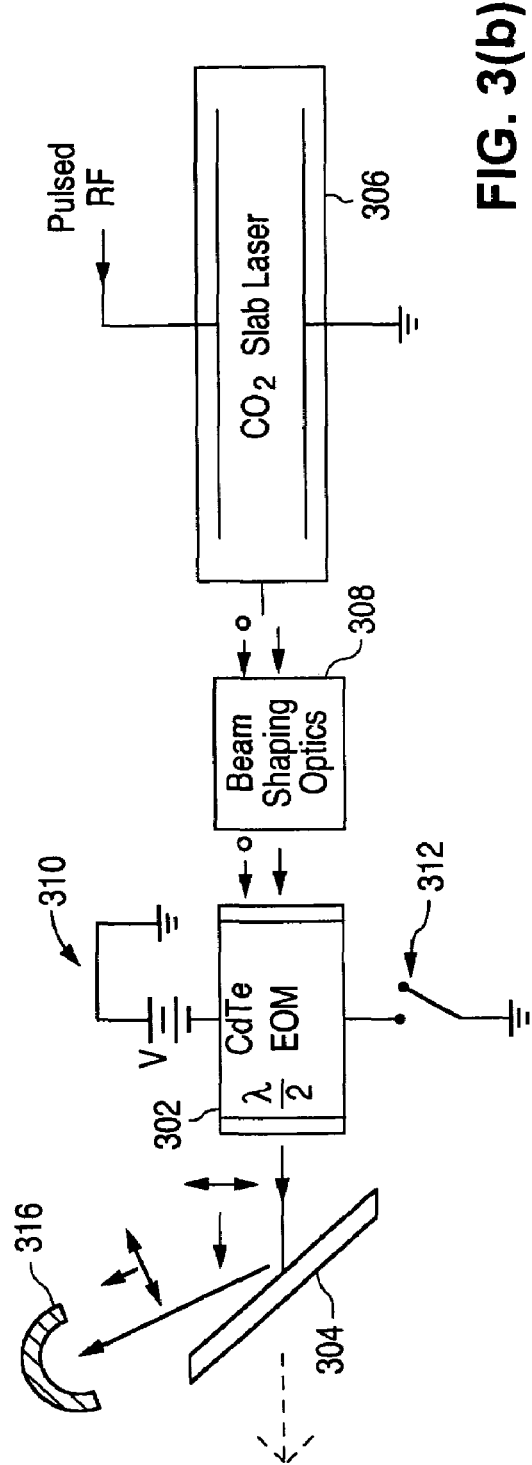

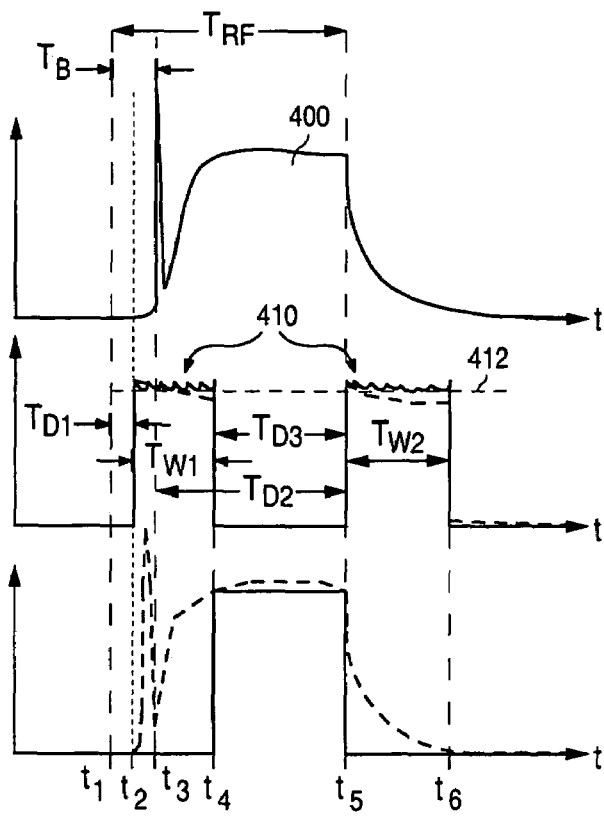
FIG. 4(a)
FIG. 4(b)
FIG. 4(c)
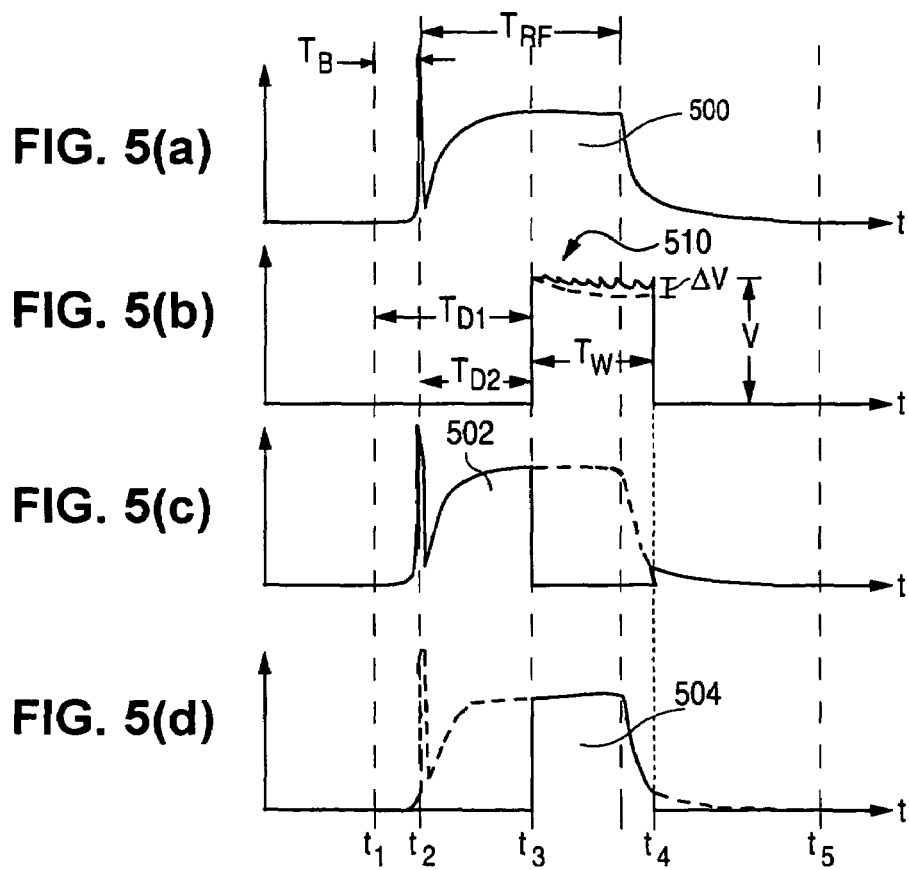
FIG. 5(a)
FIG. 5(b)
FIG. 5(c)
FIG. 5(d)

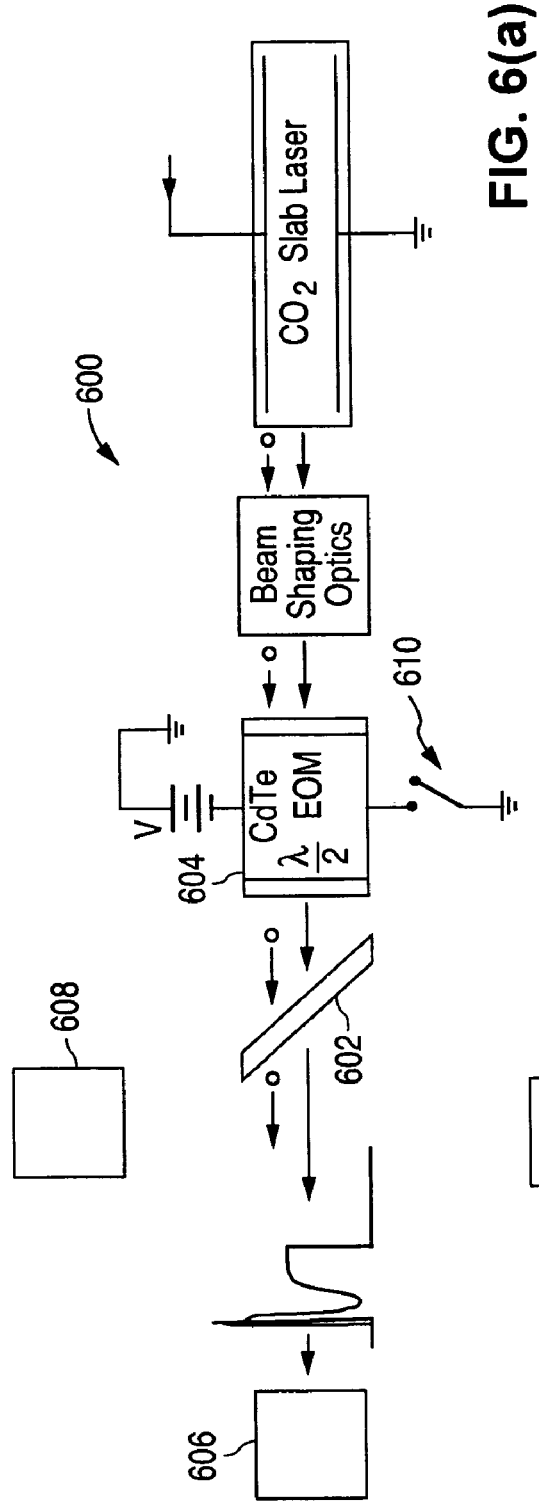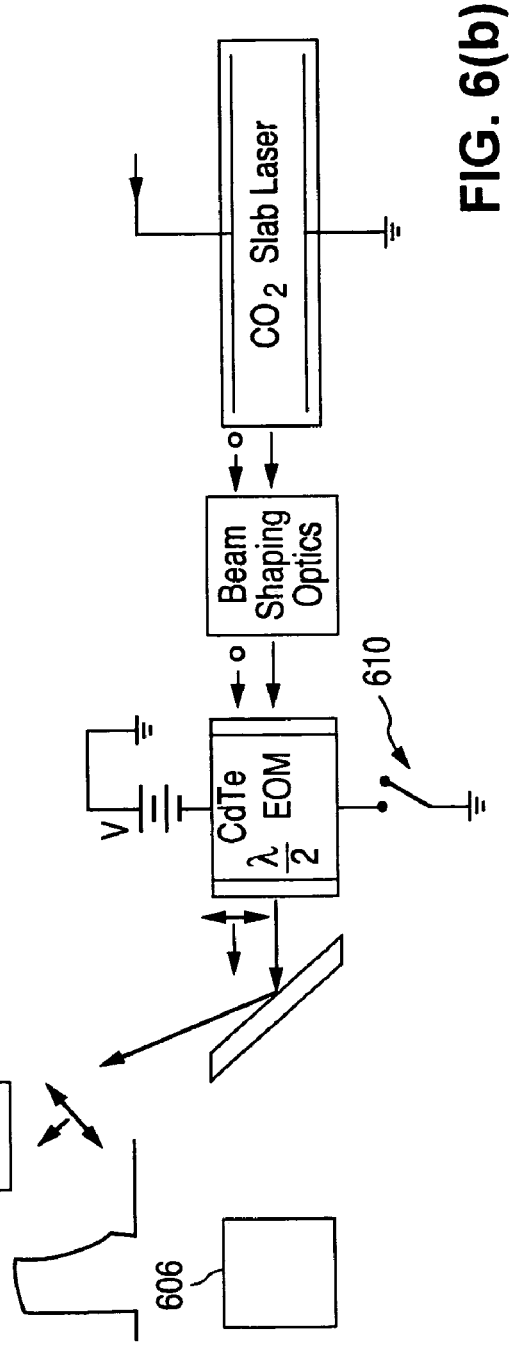
FIG. 6(a)
FIG. 6(b)

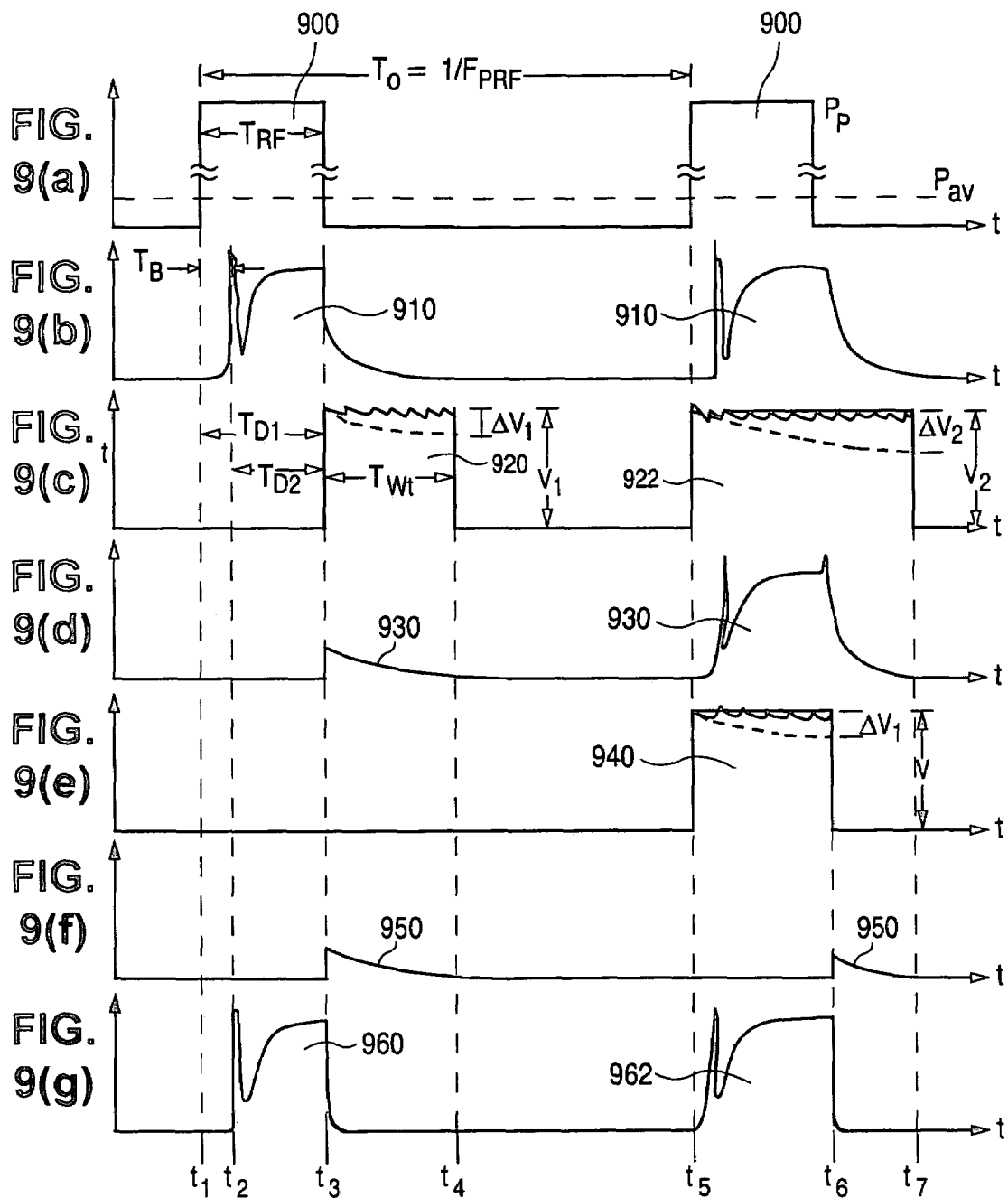

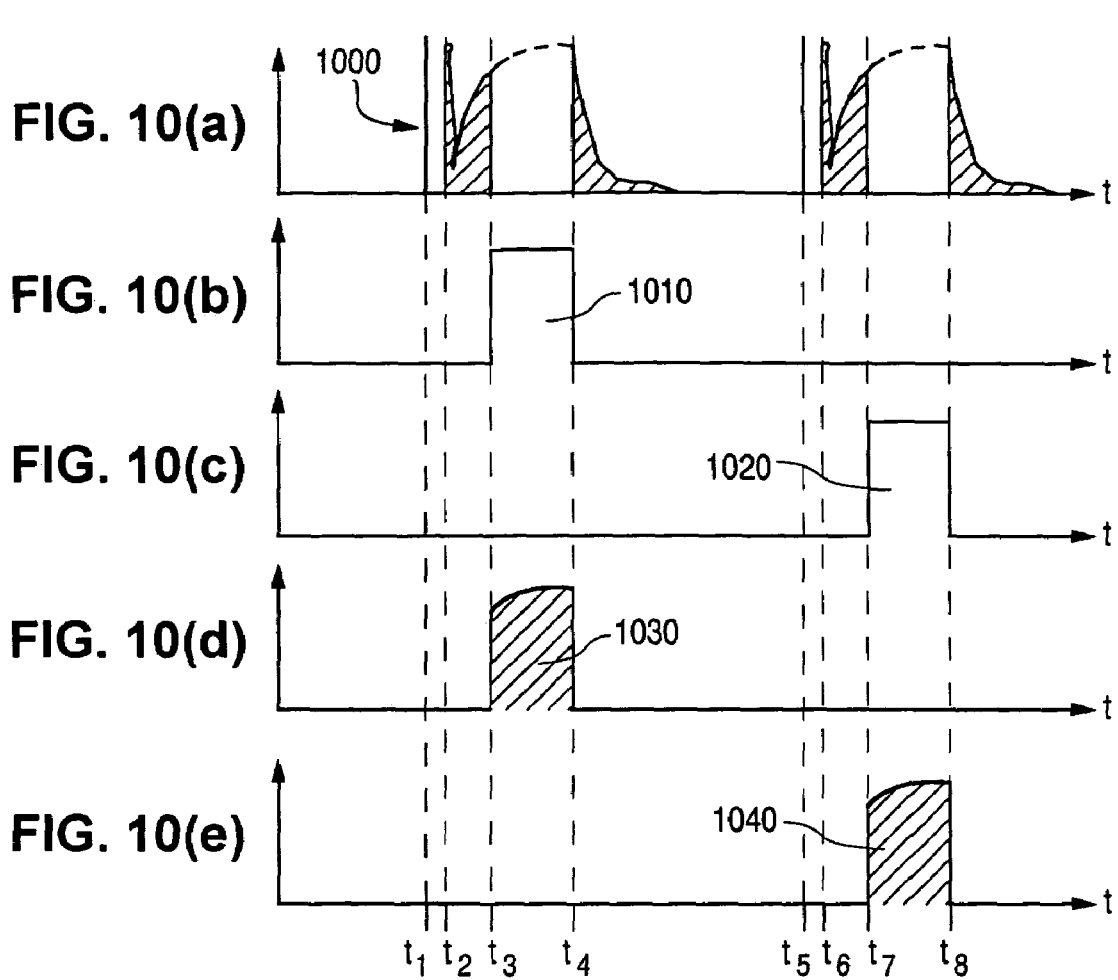
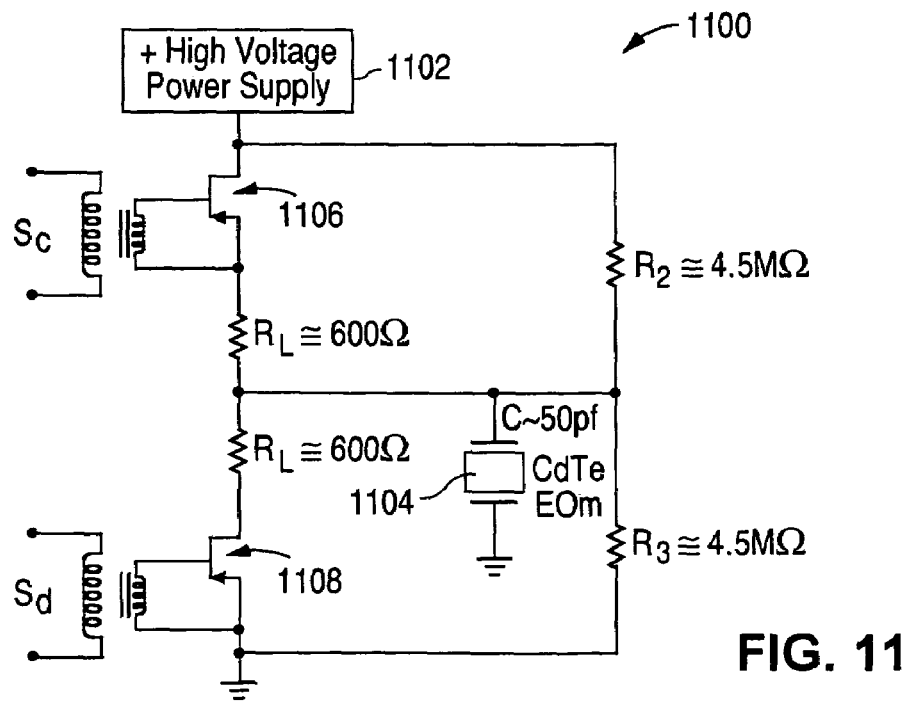

APPARATUS FOR MODIFYING CO₂ SLAB LASER PULSES

TECHNICAL FIELD OF THE INVENTION

The present invention relates to pulse-producing laser systems and applications using those pulses.

BACKGROUND

Super-pulsed $CO_2$ slab lasers are commonly used in the industry for a variety of material processing applications, such as drilling via holes in printed circuit boards. When operating such a laser, an RF pulse 100 is typically applied to the laser electrodes at time $t_1$ as shown in FIG. 1(*a*). A high peak RF power $P_p$ is applied over a period of time $T_{RF}$. The RF pulses used to drive $CO_2$ slab lasers, for example, typically have peak powers on the order of 10 kW to 20 kW, often around 15 kW. The peak powers are approximately equal to the average power capability of the RF power supply divided by the duty cycle. The pulse widths are typically between 20 µs and 100 µs, often around 55 µs, with a low duty cycle between 5% and 10%. Pulse repetition rates are typically between 500 Hz to 4.0 kHz.

The application of the RF pulse to the electrodes causes an optical pulse 110 to be generated by the slab laser, as known in the art, having typical output pulse characteristics as shown in FIG. 1(*b*). After a laser build-up time $T_B$, normally 5 µs to 10 µs for various systems, and at time $t_2$, the laser gas medium reaches an oscillating threshold and begins to oscillate. These oscillations occur first with a high peak power, gain-switched spike 112, followed by a relatively slow rise 114 in laser power until full laser output power 116 is reached. This relatively slow rise time can be detrimental to hole drilling quality, and can affect the shape and/or size of a drilled hole. When the RF excitation pulse is turned off, at time $t_3$, the output of the laser begins an exponential decline 118 as the gain in the medium dissipates, the rate of decline being determined by the Nitrogen/$CO_2$ gas mixture kinetics. This decay constitutes the long tail of each output pulse, as shown in FIG. 1(*b*) after time $t_3$. The energy in this tail of the laser pulse can degrade application quality, such as the shape of drilled via holes.

For applications utilizing these laser systems, it can be desirable to increase the pulse repetition rates to obtain increased throughput. Many of these applications are prevented from operating at these higher rates, however, as the application equipment, such as a galvanometer-based laser scanner, is presently not able to operate at these higher pulse repetition rates. For instance, a typically galvo scanner can have an upper scanning rate between about 1 kHz and about 2 kHz, which is lower than the pulse repetition rate capability of slab lasers. Many applications also would benefit from a clipping of the slow rise time 114 and long, decaying tail 118 at the beginning and end of each laser pulse, as it can be desirable for these applications to obtain a fast rise and/or fall time for these laser pulses. In a hole drilling application, for example, a faster fall time and/or faster rise time for a laser pulse can improve the quality of a drilled hole.

Presently, $CO_2$ slab laser system manufacturers attempt to adjust the shape of the slab laser pulses using acousto-optic modulators, such as to clip the slow rise time of the laser pulses, clip the long decaying tail in the back of the laser pulses, or both. Acousto-optical switches also are utilized to direct laser pulses to different locations. A problem with acousto-optic devices, however, is that there is a significant amount of power loss and beam distortion caused by the relatively large optical absorption existing in these present day Ge-based devices. These optical losses yield 15% to 20% optical losses, and lead to a degradation of laser beam quality due to the heating of the Ge crystal by the laser beam. This degradation of laser beam quality results in inferior hole quality.

BRIEF DESCRIPTION OF THE DRAWINGS

FIG. 1 is a diagram of input and output pulses of a slab laser system of the prior art.

FIGS. 2(*a*)-(*c*) are diagrams showing tail clipping of a laser pulse in accordance with one embodiment of the present invention.

FIGS. 3(*a*)-(*b*) show diagrams of one system for accomplishing the tail clipping of FIG. 2.

FIGS. 4(*a*)-(*c*) are diagrams showing front and rear end clipping of a laser pulse in accordance with one embodiment of the present invention.

FIGS. 5(*a*)-(*d*) are diagrams showing a pulse being divided into portions in accordance with one embodiment of the present invention.

FIGS. 6(*a*)-(*b*) are diagrams of a system for directing the portions of FIG. 5 to first and second scanners in accordance with one embodiment of the present invention.

FIGS. 9(*a*)-(*g*) are diagrams showing a method that can be used with the system of FIG. 8.

FIGS. 10(*a*)-(*e*) are diagrams showing another method that can be used with the system of FIG. 8.

FIG. 11 is a diagram showing a totem switch in accordance with one embodiment of the present invention.

DETAILED DESCRIPTION

Figure 7:
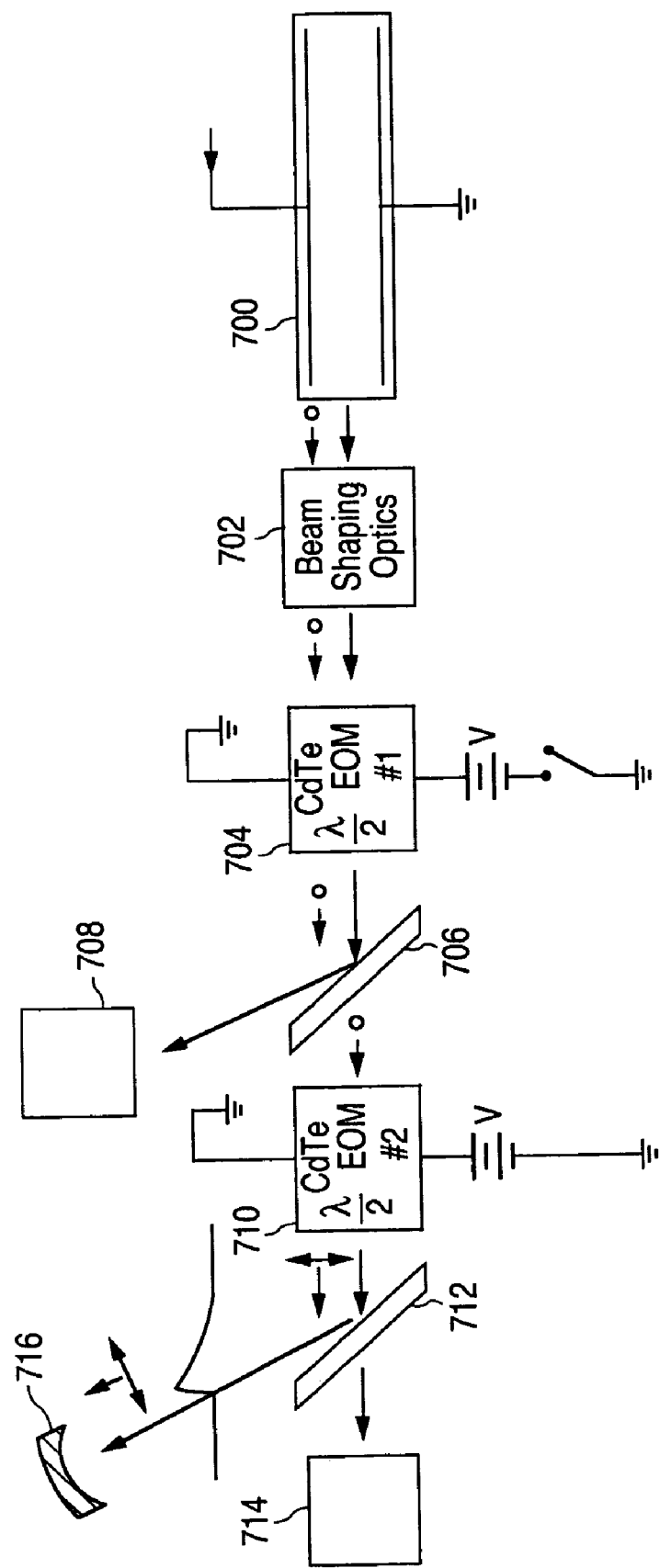
FIG. 7 is a diagram of another system for directing pulse portions to first and second scanners in accordance with one embodiment of the present invention.

Systems and methods in accordance with embodiments of the present invention can overcome these and other deficiencies in existing pulsed laser applications by improving the way in which laser pulses are shaped and/or directed. In one embodiment, an electro-optic modulator (EOM) having half-wavelength phase retardation is used in combination with a thin film polarizer (TFP) to shape pulses output from a $CO_2$ laser system. The EOM acts as an electro-optic (EO) switch, which can be turned on by applying an appropriate voltage across the electrodes of the modulator. This EOM can be any appropriate modulator, such a half-wavelength modulator utilizing a CdTe crystal. Cadmium tellurium (CdTe) crystals are presently the electro-optical crystal of choice for $CO_2$ laser systems. A CdTe EOM can have a higher optical damage threshold than other EO or AO modulators, such as described in U.S. Pat. No. 5,680,412, issued Oct. 21, 1997, entitled "APPARATUS FOR IMPROVING THE OPTICAL INTENSITY INDUCED DAMAGE LIMIT OF OPTICAL QUALITY CRYSTALS," hereby incorporated herein by reference. An increased optical damage limit can provide for improved conversion efficiency and total converted average power capability. The higher damage thresholds of CdTe crystals can result in a significant increase in the performance, reliability, and failure damage safety margin while reducing size and cost of high intensity laser systems and subsystems.

A periodic high voltage pulse charging of the capacitance of the CdTe crystal can be used to maintain a relatively constant voltage across the crystal for an extended period of time. This can help to prevent a voltage drop across the CdTe as a function of time. One example of applying a pulsed voltage to an EOM, used in this case inside a resonator for Q-switching, is described in U.S. patent application Ser. No. 10/389,081, entitled "PULSED $CO_2$ LASER INCLUDING AN OPTICAL DAMAGE RESISTANT ELECTRO-OPTICAL SWITCHING ARRANGEMENT," filed Mar. 14, 2003, hereby incorporated herein by reference. A charging pulse $S_C$ can cause a high DC voltage to be connected to an EO crystal for a time necessary to charge the capacitance of the crystal, leaving a maximum voltage $V_0$ initially across the crystal. When each charging voltage pulse is terminated, the voltage across the crystal falls with time as a result of leakage to ground, such as through a chain of resistors, while still remaining high enough to maintain the modulator in an activated state.

Multiple pulses can be delivered to the EOM electrodes over time, causing the high DC voltage to be connected to the EO switch a number of times. Each time, the voltage across the EO switch is restored to the maximum value $V_0$, after having fallen from that value as a result of leakage. The number of pulses and the interval between the delivery of sequential pulses in the train can be selected such that the voltage across EO switch does not fall below a minimum charge voltage value $V_L$, which is high enough to cause sufficient polarization rotation to prevent generation of laser-radiation.

In various embodiments, one or more CdTe electro-optical modulators (EOMs) can be used with one or more thin film polarizers (TFPs), or other appropriate polarizing elements as known in the art, as well as with one or more high voltage semiconductor totem switches capable of energizing the EOMs for shaping $CO_2$ slab laser pulses. Previous use of EOM modules inside a laser resonator are described, for example, in U.S. Pat. No. 6,697,408, entitled "Q-SWITCHED CAVITY DUMPED CO2 LASER FOR MATERIAL PROCESSING," issued Feb. 24, 2004, which is hereby incorporated herein by reference. The EOM embodiments disclosed herein can provide the pulse shaping required to obtain a fast rise and/or fall time of super pulsed $CO_2$ laser pulses, such as are needed to drill superior quality holes. Laser pulse shaping operations capable of being performed with such an arrangement can include clipping of the front and/or tail portions of a laser pulse; squaring of a laser pulse by clipping the front and back end of slab $CO_2$ laser pulses within a pulse train; splitting individual $CO_2$ slab laser pulses into two or more pulses thereby increasing the throughput of the laser hole drilling system, or other material-working system, whereby alternating portions of the split laser pulses can be directed to alternate scanners in order to overcomes the present speed limitation of existing galvo scanners; and clipping the front and tail portions of the laser pulses within the $CO_2$ laser pulse train and delivering each alternate pulses to one of two scanners, thereby doubling the throughput. Such an arrangement also can be used to prevent voltage ripple when the EOM is desired to be either completely on or off, such as through use of an improved totem switch described elsewhere herein.

FIG. 2 shows a process for the clipping of an exemplary laser pulse 200, shown in FIG. 2(a), in accordance with one embodiment of the present invention. This approach can be used, for example, to clip the tails of repetitive $CO_2$ laser pulses using a CdTe EO modulator. At time $t_1$, an RF pulse is applied to the laser electrodes as described with respect to FIG. 1. At a time $T_{D1}$ after the RF pulse is turned on, a high voltage (sometimes referred to as a high "video" voltage to indicate that the voltage pulse does not have an RF carrier like the RF pulse of FIG. 1(a), but is simply a square or rectangular voltage pulse) can be applied (at time $t_3$) to the CdTe crystal of the EO modulator. The high voltage can have an approximate value of about 5.3 kV for a CdTe crystal having dimensions of 10 mm×10 mm×50 mm and generating a half-wavelength phase retardation. The applied high voltage 210 can be pulsed, as shown in FIG. 2(b). Pulsing the high voltage allows for the amount of time in which a high voltage is applied to the crystal to be greatly reduced, thereby lowering the average power output needed from the DC power supply. A lower power output requirement can reduce the size, weight, and/or cost of the power supply. As discussed above, applying a single short pulse allows for a significant drop-off in charge voltage, while applying a long, single pulse over the entire duration of the clipping can double the voltage requirements from the DC power supply as discussed with respect to FIG. 11. When determining the number of pulses and the duration of each pulse to be applied to the crystal to apply and maintain charge, it can be necessary to determine the acceptable loss in charge on the crystal whereby acceptable results can still be obtained for an application using that laser system.

Each high voltage pulse 212 can have a time duration $T_{W1}$, sufficient to charge the capacitance of the crystal, whereby a 90 degree polarization rotation of the laser radiation is provided. The pulse can be terminated when the voltage is turned off at time $t_4$, at which time leakage will cause the voltage across to begin to drop. In order to prevent a significant voltage drop, another high voltage pulse 214 can be applied to the EO crystal. The high voltage can be repeatedly pulsed to substantially maintain the required high voltage across the CdTe crystal.

While the high voltage is applied to the crystal, the laser radiation can have a rotated polarization such that the radiation can be deflected by a thin film polarizer (TFP) plate, as will be described with respect to FIG. 3. The repetitive high pulses can be applied for a period $T_{W2}$, UP until time $t_5$ in FIG. 2(b), at which point the tail portion of the pulse is reduced to a sufficiently low value, or essentially zero power. At time $t_5$, an electrical short can be provided across the CdTe crystal in order to reduce the voltage to zero, as described elsewhere herein. The effect of the redirection of the laser pulse during application of the high voltage is shown, for example, in FIG. 2(c). Here, it can be seen that the pulse 220 has been clipped at the back end, such that the decaying tail portion is not passed to the workpiece. Such a steep end to the pulse can greatly improve the performance of, for example, via hole drilling applications. The operation of a high voltage switch that can be used to charge and discharge the capacitance of the EOM will be described with respect to FIG. 4. The time period $T_{D2}$, starting at time $t_2$ in FIG. 2(b), can be utilized as a method to determine when to apply a high voltage to the EOM. The onset of laser oscillation at time $t_2$ can be determined by detecting the emitted radiation with a detector and feeding this signal to a corresponding processor, as would be known in the art. The processor can subtract the laser build-up time, $T_B$, from the period of application of RF power, $T_{RF}$, to determine the time, $T_{D2}$, of the useable portion of the laser pulse (i.e. $T_{RF}-T_B=T_{D2}$), and then can determine time $t_3$ for turning on the voltage to the EOM in order to charge the capacitance of the crystal.

If subsequent high voltage pulses had not been applied to the CdTe crystal, the voltage on the crystal would have been reduced by an amount $\Delta V$ over time, as shown in FIG. 2(b). Such a reduction in voltage can allow an appreciable amount of radiation from the tail to reach an end workpiece and/or application, which can cause damage and/or degrade the quality of the hole drilled in the workpiece. By applying a series of recharging high voltage pulses to the electrodes of the EO modulator, the voltage across the EO crystal can be brought back to a near-full value with each pulse. In one embodiment, these high voltage recharging pulses last on the order of about 100 ns, and are repeated at a pulse repetition rate of approximately 150 kHz. While this approach can provide substantial improvement over existing approaches, there still can be some ripple variation on the high voltage applied across the EOM that can produce undesirable results for high precision applications. An embodiment that substantially eliminates this ripple variation is described elsewhere herein.

FIG. 3 illustrates a laser system arrangement 300 in accordance with one embodiment of the present invention. Reference numbers may be carried over between figures for simplicity. In this embodiment, a half-wavelength EOM 302 is placed along the beam path between a thin film polarizer 304 and a slab $CO_2$ laser having polarized output. A beam-shaping optical module (BSOM) 308 as known in the art can be used to shape the pulses exiting from the slab laser, such that the pulses fit through an aperture of the CdTe EO crystal. The optical elements composing the BSOM can be antireflection coated, in order to reduce loss and reflection back into the oscillator of the slab laser 306. A voltage source 310 can be used to apply a DC voltage across the CdTe crystal when the voltage switch 312 is closed, as shown in FIG. 3(b). With the switch 312 open, no voltage is applied across the crystal and the laser radiation passes through the thin film polarizer (TFP), and can pass on to a workpiece, application, scanner, etc. When the switch 312 is closed, the voltage across the crystal causes the polarization of the laser beam passing through the EOM 302 to be rotated 90° by the half-wavelength EOM, such as is shown in FIG. 3(b). The optical electric field vector of the radiation emitted by the laser can be rotated from a plane orthogonal to the plane of the paper (in FIG. 3(a)) to a plane parallel to the plane of the paper (in FIG. 3(b)), for example. When the polarization is rotated as in FIG. 3(b), the beam is reflected by the thin film polarizer into a beam stop, instead of being transmitted through the TFP as an output beam.

As explained with respect to FIG. 2(b), the EOM switch is closed only for the short period of time necessary to charge the capacitance of the EOM to the desired voltage, such as to approximately 5.3 kV for a 5 mm×5 mm×50 mm crystal. In order to prevent a significant voltage drop across the crystal over time, such as due to leakage of charge, the switch can be periodically closed to ensure that the capacitance is substantially fully charged, thereby preventing undesired laser radiation from leaking to the workpiece (or application receiving the light) during the "tail" period and/or front-end, slow-rise period of the laser pulse. After a time $T_{W2}$ deemed to be sufficient to have the power content in the laser pulse tail decay to essentially zero, an electrical short can be electronically placed across the crystal, and the process can be repeated.

FIG. 4 illustrates the events, over time, that can be used to clip portions of the front and back ends of a $CO_2$ slab laser pulse 400 in order to obtain a substantially square or rectangular laser pulse, having relatively fast rise and fall times. While aspects of the present invention are described with respect to square pulse shapes, it should be understood that many other laser pulse shapes can be realized in accordance with embodiments of the present invention. In the case of FIG. 4(a), the voltage to be maintained across the EOM crystal is turned on at time $t_2$, just before the onset of laser oscillation. The beginning of laser oscillation gives rise to the gain switched spike discussed earlier and reshown in FIG. 4(a). The high voltage can be repeatedly pulsed across the crystal, as described above, to keep the EOM crystal capacitance 410 approximately fully charged, or above a minimum charge level 412, during the front portion of the pulse to be clipped as shown in FIG. 4(b). At time $t_3$, the laser begins to oscillate with the initial laser spike of radiation, which typically has a high peak power but very little energy. After the pulse spike, the laser pulse rises relatively slowly such that it can be desirable to clip the initial, slow rising portion of the laser pulse in order to obtain a faster rise time. The energized half-wavelength EOM can rotate the polarization 90° so that the front end of the pulse is deflected into the laser beam stop as illustrated in FIG. 3(b) during the slow rise time of the pulse. At time $t_4$, after the period of rise time $T_{W1}$ has lapsed, a short can be electronically placed across the electrodes of the EOM crystal, thereby discharging the capacitance of the crystal to ground as seen in FIG. 4(b). The polarization of the laser radiation passing through the EOM after grounding is no longer rotated, thereby allowing the laser radiation to pass through the TFP and onto the workpiece (or scanner). The laser radiation 420 can pass onto the workpiece during the period of peak oscillation $T_{D3}$ until time $t_5$, as shown in FIG. 4(c), where the power of the laser pulse begins to fall off (e.g., after the RF power is no longer applied to the laser electrodes). At time $t_5$ the high voltage is again applied, through repeated pulsing, to the EOM crystal to maintain at least a minimum charge 412 across the crystal. The charge on the crystal can cause the tail end of the laser pulse to be clipped as previously described, sending the tail radiation into the beam stop. At time $t_6$, after there is virtually no output from the laser cavity, a short can be electronically applied across the crystal in order to discharge the capacitance of the crystal. The process can be repeated for any number of subsequent pulses.

There can be other embodiments utilizing these concepts. For instance, in an alternative embodiment the beam passing through the TFP goes to a beam stop, while a reflected beam is directed to an application scanner. The clipping of pulses also does not need to be the same for each pulse, as some pulses could have only the front or back end clipped, or could have only a portion of those ends clipped.

Pulse Splitting

For some material processing applications, such as the drilling of shallow holes where very high peak power pulses are not required, it can be desirable to split laser pulses into (at least) two portions, sending each portion to a separate scanner. The front end of the first portion of the pulse can be clipped, if desired, as well as the back end of the second portion. Such an approach can be especially attractive for use with pulsed slab lasers with a higher duty cycle operation, having longer duration output pulses with correspondingly lower pulsed peak powers. FIG. 5 shows a series of events that can be used in accordance with one embodiment of the present invention to split a laser pulse into two halves utilizing electro-optical modulators and thin film polarizers as described above. For simplicity this description will not discuss the clipping of both the front and back ends of the pulse 500, but it should be understood that clipping approaches discussed elsewhere herein, which might utilize additional elements as discussed below, could be used along with the present pulse splitting approach. An RF pulse having duration of $T_{RF}$ is again applied to the laser electrodes at time $t_1$, and the oscillation threshold begins at time $t_2$ in FIG. 5(a), after a period of time $T_B$ from time $t_1$. The laser pulse (or at least a first portion 502 thereof as shown in FIG. 5(c)) after time $t_2$ can simply pass through a TFP and on to a first scanner, for example. At time $t_3$, or roughly the mid-point of the optimal duration of the laser pulse, a series of high voltage pulses can be applied to the CdTe crystal of the EOM, thereby charging the capacitance 510 of the crystal, and maintaining the crystal at near a full charge. This charging of the crystal capacitance will cause the polarization of the pulse 500 passing through the half-wavelength EOM to rotate by 90°, causing a deflection at the thin film polarizer. The deflection can be used to direct the second portion 504 of the pulse, shown in FIG. 5(d), to a second scanner located a distance from the first scanner. To prevent a decay of the voltage charge on the crystal by an amount $\Delta V$ over time, which could allow some of the radiation to pass through the crystal to the first scanner, the high voltage applied to the crystal can be repeatedly pulsed as described above and shown in FIG. 5(b) during the duration of the second portion 504 of the pulse, or time $T_W$. At time $t_4$, the high voltage pulses can be turned off, as shown in FIG. 5(b), such that the laser pulse is no longer directed to the second scanner. It should be understood that other variations are possible, such as using the charged EOM to direct the first portion of the pulse.

An arrangement 600 that can be used with the method of FIG. 5 is shown in FIG. 6. In this arrangement, the first portion of the laser pulse having a polarization orthogonal to the plane of the Figure is allowed to propagate through the TFP 602 and continue to the first scanner 606 when the high voltage switch 610 on the EOM is open, as in FIG. 6(b), such that there is substantially no charge on the CdTe crystal. For the second portion of the pulse, in FIG. 6(b), the high voltage switch 610 can be (repeatedly) closed, such that the capacitance of the half-wavelength EOM crystal is charged and the polarization of the beam is rotated 90° to a plane parallel to the plane of the Figure, whereby the second portion is deflected by the TFP 602 and directed toward the second scanner 608. Once the second portion of the pulse is reduced to a point of almost zero power, an electrical short can be electronically placed across the EO crystal, thereby reducing the voltage to approximately zero and allowing the polarization of any subsequent beam to revert back to the original state (orthogonal to the plane of the Figure).

One potential drawback to such an arrangement is that the unclipped tail radiation can propagate through the thin film polarizer and onto the first scanner 606. One way to prevent the tail radiation from reaching the first scanner, thereby degrading the quality of holes drilled using the first scanner, for example, is to use a second half-wavelength EOM and a second TFP as shown in FIG. 7. In this arrangement, a laser pulse exiting the slab laser 700 and passing through the beam shaping optics module 702 can arrive at a first EOM 704. When a high voltage is not applied to the first EOM, the switch being open, the polarization of the pulse can be such that the pulse passes through a first TFP 706 and passes to a second EOM 710. When a high voltage is applied to the first EOM 702, the switch being closed, the polarization of the pulse can be such that the pulse is directed to a first scanner 708.

A pulse passing to the second EOM 710 can be polarized so as to be directed to a second scanner 714 or beam stop 716 by a second TFP 712, as described above. In order to prevent any tailing radiation from passing through the second TFP 712 and onto the second scanner 714, a high voltage can be applied to the second EOM 710 just prior to the high voltage applied to the first EOM 704 being reduced to zero. This will cause any spurious radiation passing through the first EOM to be rotated in polarization by the second half-wavelength EOM 710 and directed toward the beam stop 716 by the second TFP 712, such that none of the tail radiation reaches the second scanner 714.

In an alternative embodiment, a high voltage can be applied to the first EOM 704 and second EOM 710 at the same time, such as time $t_3$ in FIG. 5, such that the pulse is redirected from the second scanner 714 to the first scanner 708, but the voltage applied to the first EOM 704 can be dropped to zero near the end of the tail, at time $t_4$ in FIG. 5, while the voltage is applied to the second EOM 710 until at least time $t_5$ (in FIG. 5), to ensure that none of the tail radiation passes to the second scanner 714.

Figure 8:
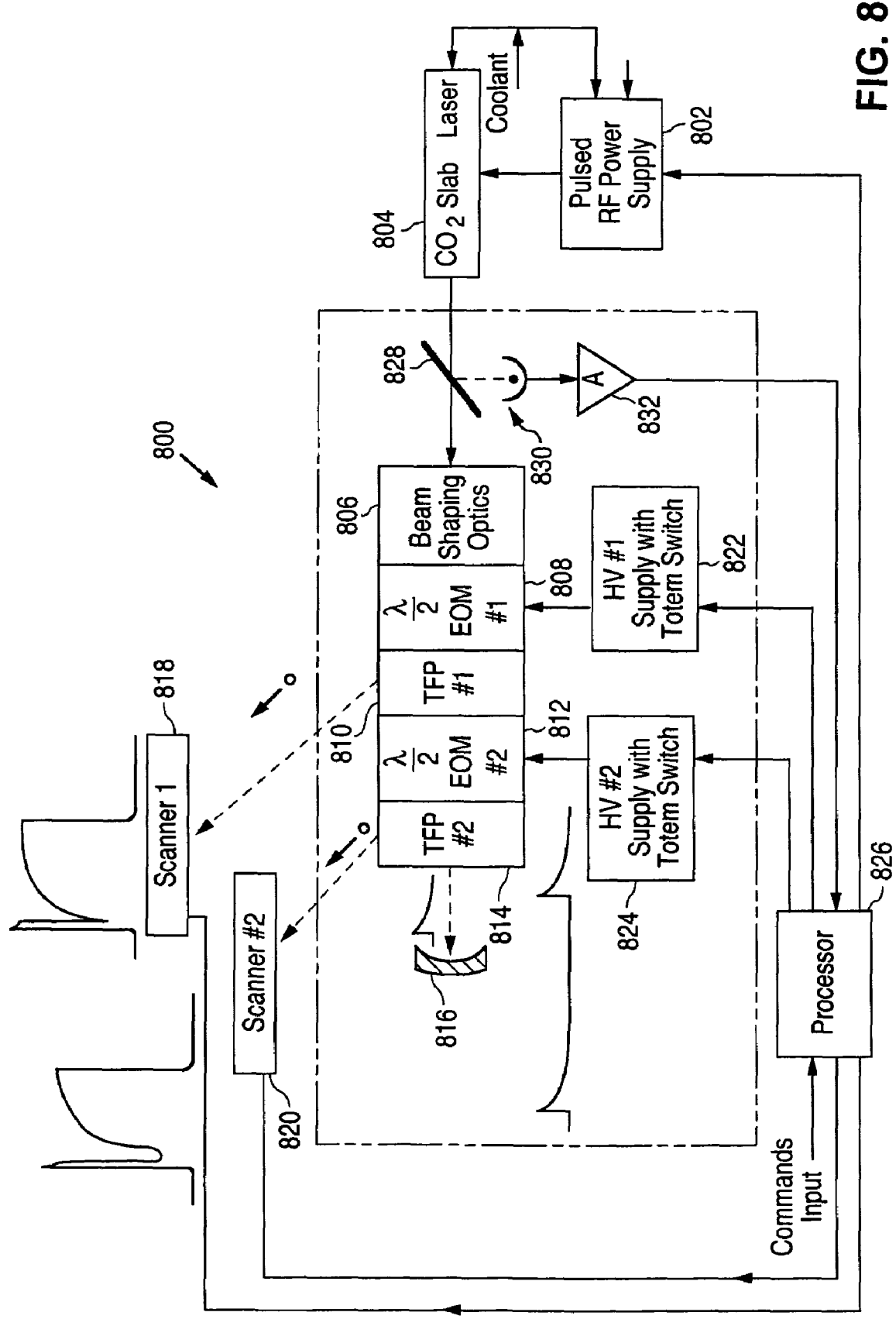
FIG. 8 is a diagram of a system for directing alternating pulses to first and second scanners in accordance with one embodiment of the present invention.

For various applications and/or system arrangements, it can be desired that both portions of the pulse exit along parallel paths and in the same plane. This can be accomplished by orienting the second TFP and second scanner such that the first portion of the pulse is directed toward the second scanner when the pulse is redirected by the second TFP. An example of such an arrangement 800 is shown in FIG. 8. In this arrangement, the second scanner 820 and beam stop 816 switch relative positions as compared with the system of FIG. 7, such that a portion of the laser pulse is passed through the second TFP 814 to the beam stop 816 when the TFP 814 does not redirect the beam due to a shift in polarization by the second half-wavelength EOM 812. When a voltage is applied to the second EOM 812 by a second high voltage source 824 with an associated totem switch, the polarization of the laser pulse is rotated such that the pulse is directed to the second scanner 820. In this way, the portion of the beam reflected by the first TFP 810 to the first scanner 818 after polarization rotation by the first EOM 808 will be parallel to the portion of the beam reflected by the second TFP 814 to the second scanner 820. The timing for such an embodiment will be similar to that of FIG. 5, except that a high voltage can be applied to the second EOM 812 for the first half of the pulse in order to allow the pulse to be directed to the second scanner 820. No high voltage will need to be applied to the second EOM 812 at any other time, then, as any spurious radiation will propagate through the second TFP 814 to the beam stop 816 and will not be received by the second scanner 820.

In the arrangement 800 of FIG. 8, a $CO_2$ slab laser 804 is shown, having an associated pulsed RF power supply 802 and a system processor 826 capable of interfacing with, and issuing separate commands to, the first and second scanners 818, 820. The slab laser 804 also can have associated with it a chiller (not shown) for providing a flow of coolant to the laser. The system processor 826 can provide commands to the chiller, to the RF laser power supply 802, and to the high voltage supplies 822, 824 (with totem semiconductor switches) for operating the EOMs 808, 812 in conjunction with the pulsed $CO_2$ laser 804 and scanners 818, 820. At least one beam shaping optic (BSO) module 806 can be placed between the slab laser 804 and the first EOM 808 in order to reconfigure the shape of the slab laser beam to fit into an entrance aperture of the EOM. A partially reflective mirror 828, photodetector 830, and amplifier 832 (or similar) subassembly can be used to provide a timing signal to the system processor 826 when a laser pulse has been emitted by the laser 804.

Such an arrangement can constitute a laser pulse shaping subsystem, as well as a laser hole-drilling system. The pulse shaping subsystem can perform any of a number of operations as described herein, including clipping the front and/or back ends of pulses within a laser pulse train, squaring the pulses within a pulse train by clipping the front and rear of each pulse, splitting a pulse in two pieces, and for directing alternate first and second pulse portions (which may include corresponding clipped front and tail ends) within a laser pulse train to separate scanners.

The physical arrangement 800 of FIG. 8 also can be utilized to redirect alternating $CO_2$ laser pulses from a repetitive pulse train to different scanners 818, 820, instead of alternating portions of each pulse, thereby increasing the throughput of a single via hole drilling laser system by a factor of two. Such an approach can be attractive since sealed-off, RF-excited slab lasers are capable of pulsed output rates higher than present day galvo scanners can handle, as present scanners can handle pulse repetition rates just below 2.0 kHz. By directing alternating pulses to different scanners, such a system can effectively double the hole drilling output of a laser system by utilizing a pulse repetition rate of approximately 4 kHz, but delivering pulses to each respective scanner at a pulse rate of approximately 2.0 kHz. The cost of two hole drilling systems, for example, each using a low power $CO_2$ slab laser with a separate EO switch and TFT is higher than the cost of a single system using a single higher power $CO_2$ slab laser, such as a single slab laser having an average output power equal to the sum of the two lower power lasers, with two EO switches and two TFTs. Therefore, the switching of alternate laser pulses from one laser to different scanners can be attractive to a manufacturer or customer using the system. In addition to the appeal of a lower cost, of course, is that fact that systems in accordance with embodiments of the present invention can provide lower optical absorption and superior beam propagation over systems that use acousto-optic switches.

One exemplary method that can be used with the system of FIG. 8 to direct alternate laser pulses from a repetitive pulse train to two different scanners will be described with respect to FIG. 9. This method will not discuss clipping of the front ends of the pulses for simplicity sake, but it should be understood that methods for such clipping described elsewhere herein can be used with the method as would be understood to one of ordinary skill in the art in light of the present disclosure.

FIG. 9(a) shows the RF pulses 900 applied to the electrodes of a $CO_2$ slab laser, as described above. FIG. 9(b) illustrates output laser pulses 910 from a repetitive pulse train corresponding to the RF pulses of FIG. 9(a), the pulses in the train each having a period of about time $T_0$ as shown, which in at least one embodiment is more than 0.25 ms but less than 1.0 ms when the laser is energized by RF pulses as in FIG. 9(a). FIG. 9(c) shows the charge on the first EOM crystal as a result of the high voltage pulses applied to the first EOM 808 by the first high voltage supply 822 of FIG. 8. When no voltage is applied to the first half-wavelength EOM 808 in FIG. 8, such as over time $T_{D2}$, the polarization of the pulse emitted by the laser remains orthogonal to the plane of the Figure and is passed through the first EOM, then being directed by the first TFP 810 into the first scanner 818. In order to clip the tail of the first pulse, a series of voltage pulses can be applied to the electrodes of the first EOM 808, starting at time $t_3$, in order to maintain an approximately full half-wavelength polarization rotation voltage across the electrodes. Placing a series of voltage pulses across the first EOM from time $t_5$ to time $t_6$ to maintains a near-full charge 922 across the crystal allows the second laser pulse 910 to pass through the first TFP 810 to the second half-wavelength EOM 812 in FIG. 8. When no voltage is applied across the crystal of the second EOM 812, the laser radiation passed through the first TFP to the second EOM passes through the second TFP 814 and on to the beam stop 816. The radiation 930 that would arrive at the beam stop is shown in FIG. 9(d). Applying a series of high voltage pulses across the electrodes of the second half-wavelength EOM 812 starting at time $t_5$ as shown in FIG. 9(e), functions to maintain a charge 940 on the crystal and rotate the polarization of the second laser pulse by 90°, back to the polarization state originally emitted by the laser 804. The second pulse having this polarization is directed by the second TFP 814 to the second scanner 820. At time $t_6$, the voltage to the second EOM is turned off, allowing the tail portion of the second laser pulse to be clipped by passing the tail portion to the beam stop. When the voltages discussed with respect to FIGS. 9(c) and 9(e) are applied, the laser radiation 950 passed to the beam stop is shown in FIG. 9(f). When the power within the tail of the second pulse has dropped to essentially zero, the voltage on the first half-wavelength EOM is turned off (at time $t_7$) as shown in FIG. 9(c). At this point, the system is ready to repeat the cycle for the next two pulses in the train. As can be seen in FIG. 9(g) for this cycle of two pulses, a tail clipped first pulse 960 is directed to the first scanner, and a tail clipped second pulse 962 is directed to a second scanner, allowing the laser to operate at twice the frequency of either of the individual scanners.

As previously stated, for some hole drilling operations a fast rise and fall time for the laser pulse is preferred. Utilizing the teachings herein, the system of FIG. 9 also can be used to clip a front portion each pulse pulses, as well as the tail portion, thereby providing both a fast rise time and a fast fall time for each pulse, while directing alternate pulses within the pulse train to one of two separate scanners as per FIG. 8. Such an approach can double the throughput while obtaining superior quality drilled holes, for example, provided by the shaped pulses. Instead of directing the first pulse to the first scanner at time $t_2$ as in the previous example, the pulse 1000 can initially be directed to the beam stop until time $t_3$, as shown in FIG. 10(a). At time $t_3$, where the laser oscillation has reaches a relatively consistent peak level, a high voltage can be applied to the first EOM such that the pulse is directed to first scanner. The totem switch to the first EOM then can be closed at time $t_4$, in order to clip the tail end of the first pulse. The high voltage 1010 that is applied to the first EOM during this time is shown in FIG. 10(b), which is shown without pulsing for simplicity. The resultant, shaped pulse 1030 that is seen by the first scanner is shown in FIG. 10(d). A similar approach can be taken to direct a shaped pulse to the second scanner, but applying a voltage 1020 as shown in FIG. 10(c) to the second EOM, to produce a shaped pulse 1040 between times $t_7$ and $t_8$ as shown in FIG. 10(e), which is directed to the second scanner. This process can be repeated for subsequent sets of pulses.

Totem Switch Operation

As discussed previously, applying a pulsed high voltage in order to charge the capacitance of an EOM still may not provide sufficiently stable operation for high precision applications, as there can be an amount of variation or ripple that exists on the voltage placed on the EOM. FIG. 11 is a schematic diagram of a totem switch 1100 that can be used to apply the high voltage to an EOM 1104, such as the switch 312 shown in FIG. 3(a) for applying a high voltage to the EOM 302. A DC power supply 1102 providing a high DC voltage is connected to an electrode of the EO switch via a resistor and at least one totem pole switch 1106 comprising a series of high voltage metal oxide silicon field effect transistors (MOSFETs) connected in series. Each MOSFET can be shunted by a resistor for swamping the MOSFET leakage current. The MOSFETs can be driven by toroidal ferrite pulse transformers.

Charging totem-pole switch 1106 includes five or six MOSFETs in one embodiment. The function of this totem pole switch is to apply a high voltage to the appropriate EOM, i.e., to close the EO switch. The CdTe crystal sandwiched between electrodes in the EOM can act as a capacitor, providing the electro-optical switch with an electrical capacitance. Accordingly, applying the high voltage pulse can be defined as charging the capacitance of the EO switch. The voltage thus established across the electrodes initially can be at a maximum, corresponding to the applied voltage, then can progressively decrease, due to leakage effects. When a voltage is established across the electrodes, the switch can be said to be in an activated state.

After the EOM switch is "closed" by applying the high voltage as described above, it can be "opened" by rapidly discharging the capacitor formed by the electrodes and the crystal, thereby effectively removing any established voltage across the electrodes. This can be accomplished by another totem-pole switch 1108, which can be operated to connect the hot electrode of the EO switch to ground. This can reduce the voltage across the electrodes effectively to zero. In this state the switch is referred to as deactivated. Each totem-pole switch 1106, 1108 can comprise the same number of series-connected MOSFETs. The MOSFETs can be driven by toroidal pulse transformers. The MOSFETs each can be shunted by an appropriate resistor, which provides that, once the optical switch is discharged, the voltage across the electrodes is maintained sufficiently close to zero that the crystal causes essentially zero polarization rotation. The toroidal pulse transformers can be energized by amplifiers and control circuitry in response to pulse signals $S_C$ and $S_D$ respectively. These signals can be synchronized with the RF voltage applied to the gain-medium.

In existing totem switches, resistors such as $R_3$ have resistance values of approximately 150 k$\Omega$. In accordance with one embodiment of the present invention, the resistance of $R_3$ can be on the order of about 4.5M$\Omega$. This higher resistance of $R_3$ provides a longer RC time constant for the discharge time of the EOM capacitor, such as at least a full order of magnitude longer. The EOM capacitance can have a value of approximately 50 to 60 picofarads including the stray capacitance. The longer RC time constant can result in a significantly lower amount of voltage decay and/or voltage ripple across the EOM electrodes.

Since $R_3$ and $R_2$ in FIG. 11 have the approximately the same value (about 4.5 M$\Omega$), however, it would be necessary to supply about twice the voltage (e.g., 2×5.3 kV) from the high voltage power supply 1102 to obtain the desired half wavelength voltage (about 5.3 kV) across the electrodes of the EOM 1104, in order to obtain this larger RC time constant. The need for twice the voltage arises due to the voltage divider effect caused by the equal resistances of $R_2$ and $R_3$, which can result in one half of the power supply voltage being applied across the crystal.

In order to avoid the problem of doubling the high voltage, systems and methods in accordance with one embodiment of the present invention can utilize a pulsing charge voltage signal ($S_C$) applied to the upper series of MOSFET switches 1106 when a high voltage is desired across the EOM 1104. Applying the voltage to the upper series of MOSFETs causes the MOSFETs to become conductive, such that current can flow through the MOSFETs. The charging current then flows from the high voltage supply through the MOSFETs and the low voltage (~600 $\Omega$) resistor $R_L$ for a fast charging/recharging time for the EOM. During this time, no pulsing discharge signal ($S_d$) is applied to the lower series of MOSFET switches 1108.

The application of the pulsing discharge signals can be described with respect to FIG. 12. FIG. 12(a) shows a continuous voltage 1200, such as a voltage of about 5.3 kV, that is provided to the semiconductor totem switches by the high voltage power supply 1102 of FIG. 11. This continuous voltage can be used to charge and discharge the capacitance of the CdTe EO modulator 1104. The switches 1106, 1108 in one embodiment each consist of at least five 1.2 kV, 3 amp, N-channel power MOSFETs (such as IXTP-3N120 MOSFETs available from IXYS Corporation of Santa Clara, Calif.) connected in series. Five such MOSFETs can provide the capability of switching up to 6.0 kV volts and up to 15 amps. If it is desirable to be more conservative, six such MOSFETs can be used. FIG. 12(b) illustrates a sequence of high voltage pulses 1210 that can be desired across the EOM electrodes. It can be seen that the voltage to be placed across the electrodes of the EOM is essentially the same as the voltage supplied by the high voltage power supply 1102 of FIG. 11(a). The high voltage can be applied for an "on" or charge period of time $T_{EOC}$, and not applied between pulses for an "off" or discharge period of time $T_{EOD}$, as seen in FIG. 12(b). The "on" period of time, as well as each "off" period between pulses, can be at least 10 µs and up to more than 100 µs for certain embodiments, depending on the system requirements. A $CO_2$ slab laser can be relatively flexible regarding the length of the "on" and "off" times. The period, $T_p$, of a high voltage pulse train (as shown in FIG. 12(b)) can be determined to a large extent by the speed capability of application utilizing the laser pulses, such as a hole drilling laser application. At present, the system speed can be limited in general by the speed of galvo scanners used for the application, which is currently below 2 kHz, such that a maximum value for $T_p$ would be about 0.25 ms for a system directing alternate laser pulses within a laser pulse train to different scanners.

Figure 12A:
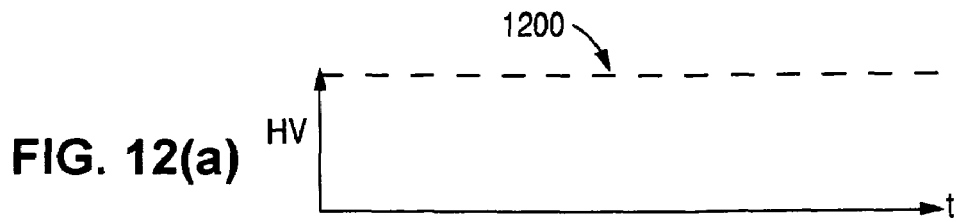
FIGS. 12(*a*)-(*d*) are diagrams showing a method that can be used with the totem switch of FIG. 11.
Figure 12B:
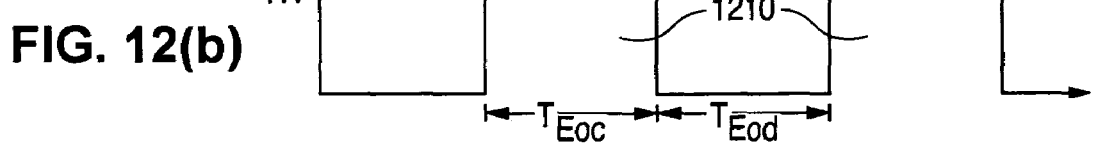
Figure 12C:
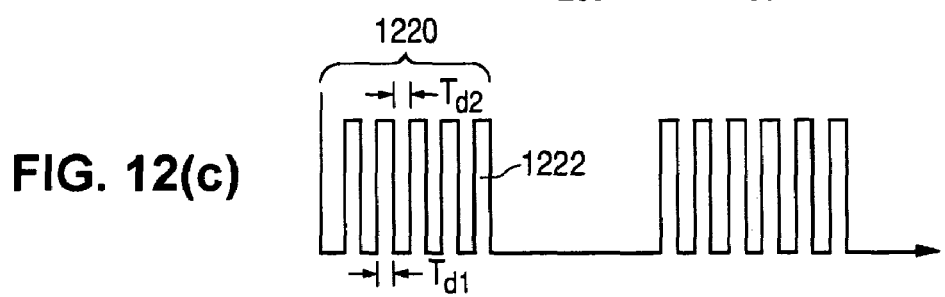

As illustrated in FIG. 12(c), a series 1220 of discharge command signals ($S_d$) 1222 can be provided to the inputs of the lower series MOSFET switches (1108 in FIG. 11) when no voltage is to be applied to the EOM 1104. These series of $S_d$ signal pulses periodically turn on the lower MOSFETs 1108, thereby discharging the capacitance of the EOM through the resistor $R_L$, of approximately 600 $\Omega$, and bringing the EOM voltage to (essentially) zero. The "on" time duration of each $S_d$ pulse is denoted by $T_{d1}$ in FIG. 12(c). The $S_d$ signal then can be turned off for an "off" time duration $T_{d2}$, which can cause the voltage across the EOM to begin to increase. This voltage increase will be very slow due to the large RC time constant of the $R_2$ resistor. In one embodiment, $T_{d1}$ is about 160 ns, while $T_{d2}$ is about 3.0 µs. Pulsing the $S_d$ signal allows the voltage across the EOM to be maintained at essentially zero voltage, resulting in superior performance compared to existing totem switch configurations.

Figure 12D:
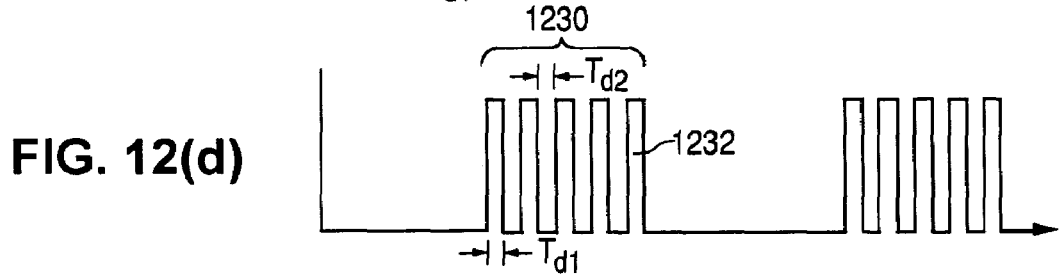

Accordingly, when voltage is to be applied to the EOM electrodes for a time $T_{EOC}$, and repeated with a period Tp, the pulsed $S_d$ signal can be turned off and a series 1230 of charge command signal (Sc) pulses 1232 can be provided to the input of the upper series of connected MOSFETs (1106 in FIG. 11) as shown in FIG. 12(d). For simplicity, the "on" time duration ($T_{d1}$) and "off" time duration ($T_{d2}$) of these charge pulses shown to be approximately the same as for the discharge pulses of FIG. 12(c), although the charge and/or discharge times can be different for each set of MOSFETs. The short time of $T_{d2}$, coupled with the relatively large RC time constant due to the large resistance of $R_3$, can prevent any appreciable voltage drop from occurring across the EOM during the $T_{d2}$ off times of the periodic pulses 1232 of FIG. 12(*d*). Pulsing the $S_C$ signal therefore allows the voltage across the EOM to be maintained at the appropriate voltage, resulting in superior performance compared to existing totem switch configurations.

Figure 13:
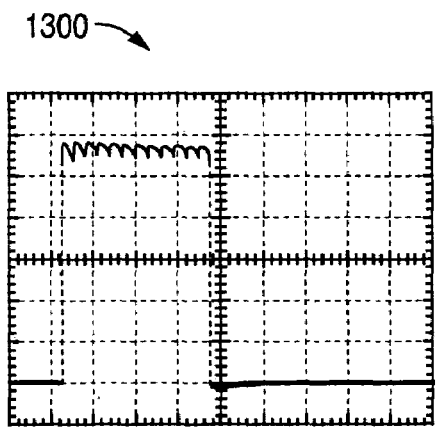
FIG. 13 is a plot showing voltage for a pulse using a totem switch of the prior art.
Figure 14:
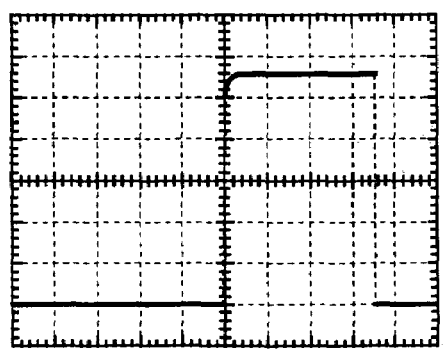
FIG. 14 is a plot showing voltage for a pulse using the totem switch of FIG. 11.

The superior performance relative to existing totem switch configurations is demonstrated in the exemplary data plots of FIGS. 13-14. FIG. 13 shows data 1300 obtained for the high voltage across the EOM using an existing totem switch. It can be seen in FIG. 13 that the voltage during the "on" period has an appreciable amount of ripple variation, here shown to be approximately 11% of the entire voltage. FIG. 14 shows data 1400 obtained for the high voltage across the EOM using an improved totem switch as described with respect to FIGS. 11-12. It can be seen that the voltage signal has almost zero ripple, which can produce superior results in an application such as via hole drilling, compared to those obtained using existing totem switches.

EOM Design

An exemplary assembly arrangement for an EOM in accordance with one embodiment of the present invention can have a CdTe crystal in contact with a pair of electrodes, located between dielectric holding members. Each holding member can have an aperture extending therethrough to allow electrical contact to be made to the electrodes. Windows can be positioned at either end of the crystal, with the windows having a maximally reflective coating on an outer surface thereof. The windows can be clamped via clamps and/or screws inserted into the holding members, such that the surfaces of the windows are in thermal contact, and effectively in optical contact, with the respective surfaces of the crystal. The term effectively in optical contact, here, means that surfaces in thermal contact are sufficiently close that the airspace therebetween behaves as a single interface at all common $CO_2$ laser wavelengths. Clamps can hold a $BaF_2$ window in contact with a corresponding ZnSe window in one embodiment, in addition to holding the ZnSe window in contact with the CdTe crystal. The windows at the opposite ends of the crystal can have opposite surfaces thereof arranged about parallel to each other.

An EO crystal, such as a CdTe crystal in an EO modulator, can become damaged during operation of the EO switch. Previously, increasing the damage threshold of optical elements, more specifically the laser beam exiting and entrance surfaces of such crystals, was performed by depositing optical coatings of passive optical materials on these surfaces which have a higher laser damage threshold than the bulk material. This technique has a limited beneficial effect due to the small thickness of the thin film, which yields a very limited conduction cooling capacity. Instead, transparent passive optical elements, such as ZnSe or GaAs optical elements, can be positioned at the laser beam exiting and entrance surfaces of the crystal, whose surfaces have higher optical damage thresholds than that of the crystal. The surfaces of the passive optical elements can be placed up against respective exiting and entrance surfaces of the crystal. It is generally difficult to get anti-reflection coatings to stick well to the laser beam entrance and exiting surfaces of CdTe modulators. Peeling of these coatings is a common damage failure for these modulators. This problem does not exist with a passive optical window material such as ZnSe or GaAs. These surfaces can be optically polished to assure good optical and thermal contact. Since the optically transparent passive optical elements have higher mass than optical coatings, the elements can provide vastly superior cooling, and therefore, considerably higher laser damage threshold for the surfaces.

An EOM crystal also can become damaged due to increased thermal heating, stemming from the lower thermal conductivity of the atmospheric environment. A CdTe EOM can be designed to provide for superior cooling of the CdTe crystal in order to prevent thermal run-away, such as through the use of a BeO dielectric and high RF resistivity liquid cooling. The modulator also can be designed to reduce the presence of temperature gradients across the CdTe crystal, greatly reducing the amount of laser beam distortion that can propagate through the crystal, and to enable the application of twice the DC voltage, over present quarter-wavelength existing modulators, required to achieve the half-wavelength phase retardation. The modulators can be designed to reduce phase retardation by the CdTe crystal without arcing or the generation of corona discharge. Such designs are described, for example, in U.S. patent application Ser. No. 10/886,902, filed Jul. 8, 2004, entitled "ELECTRO-OPTICAL MODULATOR MODULE FOR CO2 LASER Q-SWITCHING, MODE-LOCKING, AND CAVITY DUMPING," which is hereby incorporated herein by reference. As described therein, for example, air cooling may not be sufficient for operation of the crystal at high repetition rates, such that it is necessary to provide improved cooling and/or heat removal that does not impart undesirable stress on the crystal or produce other undesirable effects. EOM components can be contained within an appropriate modulator housing, such as a metal housing capable of providing RF shielding. The modulator can contain an elongated, rectangular CdTe crystal as described elsewhere herein. In order to obtain optimum performance from the crystal, it can be desirable to apply no more pressure to the crystal than is necessary to hold the crystal in place. Components used to hold the crystal can be arranged to allow for a normal expansion and contraction of the crystal without causing excessive stress. To obtain optimum performance, the crystal can be uniformly and/or symmetrically cooled, such as by a flow of liquid or gas, such that the temperature stays below about 70° C., for example. Maintaining the temperature of the crystal can prevent a substantial change in thermal resistance. Further, minimizing temperature gradients across the crystal that would arise from uneven cooling can help to avoid significant bending and lensing of the laser beam propagating down the length of the crystal due to refractive index gradients.

In order to obtain sufficient cooling without placing undue stress on the crystal, soft metal cushions can be placed between the crystal and the metal electrodes that can ensure good thermal and electrical contact between the electrodes and the crystal. The electrodes each can be pressed against the metal cushions by a dielectric wall structure, which can include any of a number of fastening, clamping, or holding mechanisms for applying pressure to the electrodes. The dielectric material of the wall structures can have a good thermal conductivity and a low dielectric constant, in order to reduce the RF capacitance loading of the structure. A material that has produced favorable results as the wall structure is a Beryllium Oxide (BeO) ceramic material. Surrounding the crystal with a low dielectric constant material that lowers the capacitance coupling to ground can prevent RF and/or arcing and subsequent damage to the EO crystal. Cooling passages can be machined within, or in thermal contact with, the wall structures to allow liquid coolant to flow approximately the length of the structure. In order to provide support orthogonal to that of the electrodes, a pair of ceramic holders can be used to contact the sides of the crystal that are not contacted by the soft cushions. These ceramic holders can be made of any appropriate thermally conducting material, such as a BeO ceramic, and can be machined for uniform contact between the holders and the EO crystal, thereby obtaining good thermal conductivity from the crystal to at least one of the wall structures in contact with the holders.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method for clipping a laser cavity pulse emitted from a laser and travelling along a beam path to a workpiece, said pulse being clipped prior to reaching the workpiece, comprising:
   receiving a laser pulse emitted from said laser cavity and having a first polarization state to an electro-optic modulator positioned along said beam path between the laser cavity and the workpiece, the electro-optic modulator containing a crystal positioned between a pair of electrodes arranged to rotate the polarization of the laser pulse to a second polarization state when a charge voltage is placed across the crystal by the pair of electrodes;
   applying a voltage across the crystal in order to charge the crystal during a period of time wherein at least one of a front end portion and a back end portion of the pulse passes through the crystal, the charging of the crystal causing a rotation in polarization of the laser pulse during the period of time; and
   passing the laser pulse to a polarizing element positioned along the beam path, the polarizing element capable of one of reflecting along a second path and transmitting along a first path said at least one of a front end portion and a back end portion of the pulse, a remainder of the laser pulse being one of reflected and transmitted along the other of said first and second paths.

2. A method according to claim 1, further comprising:
   using a totem pole switch electrically coupled between a high voltage source and the electro-optic modulator to apply a series of voltage pulses to the electro-optic modulator in order to maintain a minimum charge across the crystal during the period of time in which the crystal is charged.

3. A method according to claim 1, further comprising:
   discharging the crystal at the end of the period of time in which the crystal is charged.

4. A method according to claim 1, wherein:
   the crystal is an elongated cadmium tellurium (CdTe) crystal.

5. A method according to claim 1, wherein:
   the electro-optic modulator is a half-wavelength electro-optic modulator.

6. A method according to claim 1, wherein:
   the electro-optic modulator is capable of rotating a polarization of the pulse by 90°.

7. A method according to claim 1, further comprising:
   receiving said at least one of a front end portion and a back end portion of the pulse to a beam stop.

8. A method as recited in claim 1, wherein the voltage is applied to the crystal during a period of time when a front end portion of the pulse passes through the crystal and wherein the voltage is applied to the crystal during a period of time when a back end portion of the pulse passes through the crystal and wherein the voltage is not applied while the central potion of the pulse passes through the crystal.

9. A method of clipping a pulse emitted from a laser cavity prior to reaching a workpiece, said pulse having a particular polarization state, said method comprising the steps of:
   directing the pulse emitted from the laser cavity through an electro-optic crystal, said crystal arranged such that when it is energized, the polarization state of light passing therethrough will be rotated;
   energizing the crystal as the front portion of the pulse passes therethrough;
   de-energizing the crystal after the front portion of the pulse passes therethrough;
   energizing the crystal as the rear portion of the pulse passes therethrough; and
   directing the pulse to a polarizer for redirecting the path of one of:
   (a) the front and back portions of the pulse and
   (b) the central portion of the pulse.

10. A method as recited in claim 9, wherein said electro-optic crystal is formed from cadmium tellurium.

11. A method as recited in claim 9, wherein when said crystal is energized, the polarization state of the light passing therethrough will be rotated by ninety degrees.

12. A method as recited in claim 9, wherein the front and rear portions of the pulse are received by a beam stop after interaction with the polarizer.

13. A method as recited in claim 9, wherein after interaction with the polarizer, the central portion of the pulse is received by a scanner and thereafter directed to the workpiece.

* * * * *